(12) United States Patent
Mixon

(10) Patent No.: US 8,653,365 B1
(45) Date of Patent: Feb. 18, 2014

(54) OVERFILL WARNING WIRING SYSTEM FOR TANK TRUCKS

(76) Inventor: Claude W. Mixon, Billings, MO (US)

(*) Notice: Subject to any disclaimer, the term of this patent is extended or adjusted under 35 U.S.C. 154(b) by 602 days.

(21) Appl. No.: 12/689,776

(22) Filed: Jan. 19, 2010

Related U.S. Application Data

(60) Provisional application No. 61/146,757, filed on Jan. 23, 2009.

(51) Int. Cl.
*H01B 7/00* (2006.01)

(52) U.S. Cl.
USPC ............ 174/71 R; 174/72 R; 174/72 A

(58) Field of Classification Search
USPC .............. 174/71 R, 72 A, 72, 72 R, 91
See application file for complete search history.

(56) References Cited

U.S. PATENT DOCUMENTS

| | | | | |
|---|---|---|---|---|
| 2,934,102 | A * | 4/1960 | Martin | 141/21 |
| 3,146,299 | A * | 8/1964 | Norton | 174/88 R |
| 4,488,970 | A * | 12/1984 | Clark | 210/746 |
| 5,168,124 | A * | 12/1992 | Takase et al. | 174/23 R |
| 5,315,563 | A * | 5/1994 | Lichtenfels et al. | 367/99 |
| 5,333,653 | A * | 8/1994 | Rzesutock et al. | 141/1 |
| 5,349,994 | A | 9/1994 | Koeninger | |
| 5,536,904 | A * | 7/1996 | Kojima et al. | 174/23 R |
| 5,644,491 | A * | 7/1997 | Fiske et al. | 701/102 |
| 5,937,950 | A * | 8/1999 | Adams et al. | 174/72 R |
| 6,291,770 | B1 * | 9/2001 | Casperson | 174/72 A |
| 6,386,917 | B1 * | 5/2002 | Sakaguchi | 439/606 |
| 6,503,098 | B2 * | 1/2003 | Aoki et al. | 439/502 |
| 6,786,765 | B2 * | 9/2004 | Bauermeister et al. | 439/535 |
| 6,880,219 | B2 * | 4/2005 | Griffioen et al. | 29/401.1 |
| 7,390,209 | B2 * | 6/2008 | Liu | 439/271 |
| 7,709,736 | B2 * | 5/2010 | Irisawa | 174/71 R |
| 7,842,210 | B2 * | 11/2010 | Chen | 264/135 |
| 8,463,383 | B2 * | 6/2013 | Sakai et al. | 607/34 |
| 2002/0126457 | A1 * | 9/2002 | Kameyama | 361/728 |
| 2002/0148633 | A1 * | 10/2002 | Kanda | 174/77 R |
| 2008/0281528 | A1 * | 11/2008 | Relle, Jr. | 702/19 |

* cited by examiner

*Primary Examiner* — Timothy J Thompson
*Assistant Examiner* — Pete Lee
(74) *Attorney, Agent, or Firm* — Spencer Fane Britt & Browne LLP

(57) ABSTRACT

An overfill warning wiring system has a plurality of fluid tight connectors integrally molded to a first fluid tight cabling, the connectors in turn connected to fluid tight connectors protruding from fluid tight sensor modules in manhole covers of a tank truck, the first fluid tight cabling connected to a main fluid tight cabling which is in turn connected in a fluid tight manner to a fluid tight monitor.

15 Claims, 2 Drawing Sheets

OVERFILL WARNING WIRING SYSTEM FOR TANK TRUCKS

CROSS REFERENCE TO RELATED APPLICATIONS

This application is a non-provisional application claiming the priority date of provisional application Ser. No. 61/146,757 filed on 23 Jan. 2009, the specification contained therein incorporated into this application by this reference thereto.

BACKGROUND OF THE INVENTION

1. Field of the Invention

This invention relates to a wiring system for tank trailers to simplify installation and maintenance 2. Prior Art Statement Existing wiring looms for fuel overfill sensing systems on tractor trailer tankers consists of multiple pieces of multi-stranded wiring cable daisy-chained from sensor to sensor in the drain channel on top of the tank truck. The overfill sensing system usually operates at about 250 milliamps at 12.8 volts DC. Since the cabling is a special tin coated wire and cannot be soldered, installation requires a skilled electrician as each wire must be fitted with a crimp connector and hand assembled to each sensor, the cabling daisy-chained to the next sensor and subsequent sensors, the cabling routed to and connected to the onboard monitor with separate links made from the onboard monitor to the API interface sockets. Since a five compartment tanker truck uses a six wire cable, each sensor has twelve wire ends and hence twelve connections, the time required to install a system on a five compartment tank trailer often approaches 10 man-hours for a skilled electrician. Tank trucks with fifteen compartments more than quintuples the time required as each sensor now needs thirty connections, fifteen in and fifteen out to complete the daisy-chain. A major maintenance problem then exists at the hand assembled joints as they are subject to intrusion by environmental factors, including, but not limited to, water, sand, grit, dust, fuel, vibration, scuffing and the like because the sensor body connections are not fluid tight resulting in corrosion of the internal body of the sensor, the monitor or the API socket, any of which causes loss of electrical connection. Some tank trucks require repair within 3 months of initial assembly since all connections are made through mechanical compression fittings disposed in the sidewall of the sensor bodies and the monitor box and these mechanical fittings are not fully fluid tight. Additionally, the cabling used for wiring is not fully water and fuel resistant and hence deterioration of the insulation on the cabling causes additional failures. Failure most often is discovered at fuel delivery when the API sockets connecting the tanker to the fueling facility detect an onboard system failure in the overfill warning system and the driver is denied authorization for fueling thus requiring the tank trailer driver to have the system overhauled before delivery can be started, resulting in downtime and lost income.

SUMMARY OF THE INVENTION

An object of this invention is to provide a pre-wired wiring loom for tank trailers that can be installed to pre-molded sensors installed in the manhole covers of the tanks of the tank trailer.

A primary goal of this invention is to provide a pre-molded sensor connections for the sensors disposed in the manhole covers of the tanks of the tank trailer.

A significant feature of this invention is to provide pre-molded sensor connections for the tanks of the tank trailer with at least two pins.

A main purpose of this invention is to provide injection molded connectors for the sensors disposed in the manhole covers of the tanks of the tank trailers.

A primary principle of this invention is to provide one body harness from the onboard monitor that connects to the upper main body loom.

A principal aim of this invention is to provide a wiring system wherein the cabling is constructed of a specialty polymer resistant to gasoline, diesel fuel, ethanol and combinations thereof A primary aspect of this invention is to provide a wiring system for a tank trailer wherein the connections to the sensors are fluid tight.

Another primary aspect of this invention is to provide a wiring system for a tank trailer wherein the connections to the monitor and API sockets are fluid tight.

Another primary aspect of this invention is to provide a wiring system for a tank trailer wherein the body harness and the upper main body loom are pretested to ensure that the connectors molded thereto and the cabling carrying the connectors are fluid tight.

Another primary goal of this invention is to provide a pre-molded sensor connections for the sensors disposed in the manhole covers of the tanks of the tank trailer wherein the pre-molded sensor connections are disposed at intervals along a cabling equal to the distance between the manhole covers.

DESCRIPTION OF THE PREFERRED EMBODIMENTS

While the various features of this invention are hereinafter described and illustrated as a overfill warning wiring system comprising a plurality of fluid tight connectors integrally molded to a fluid tight cabling wherein the connectors are connected to fluid tight connectors protruding from fluid tight sensor modules or a fluid tight monitor, it is to be understood that the various features of this invention can be used singly or in various combinations thereof overfill warning wiring system as can hereinafter be appreciated from a reading of the following description.

Figure 1:
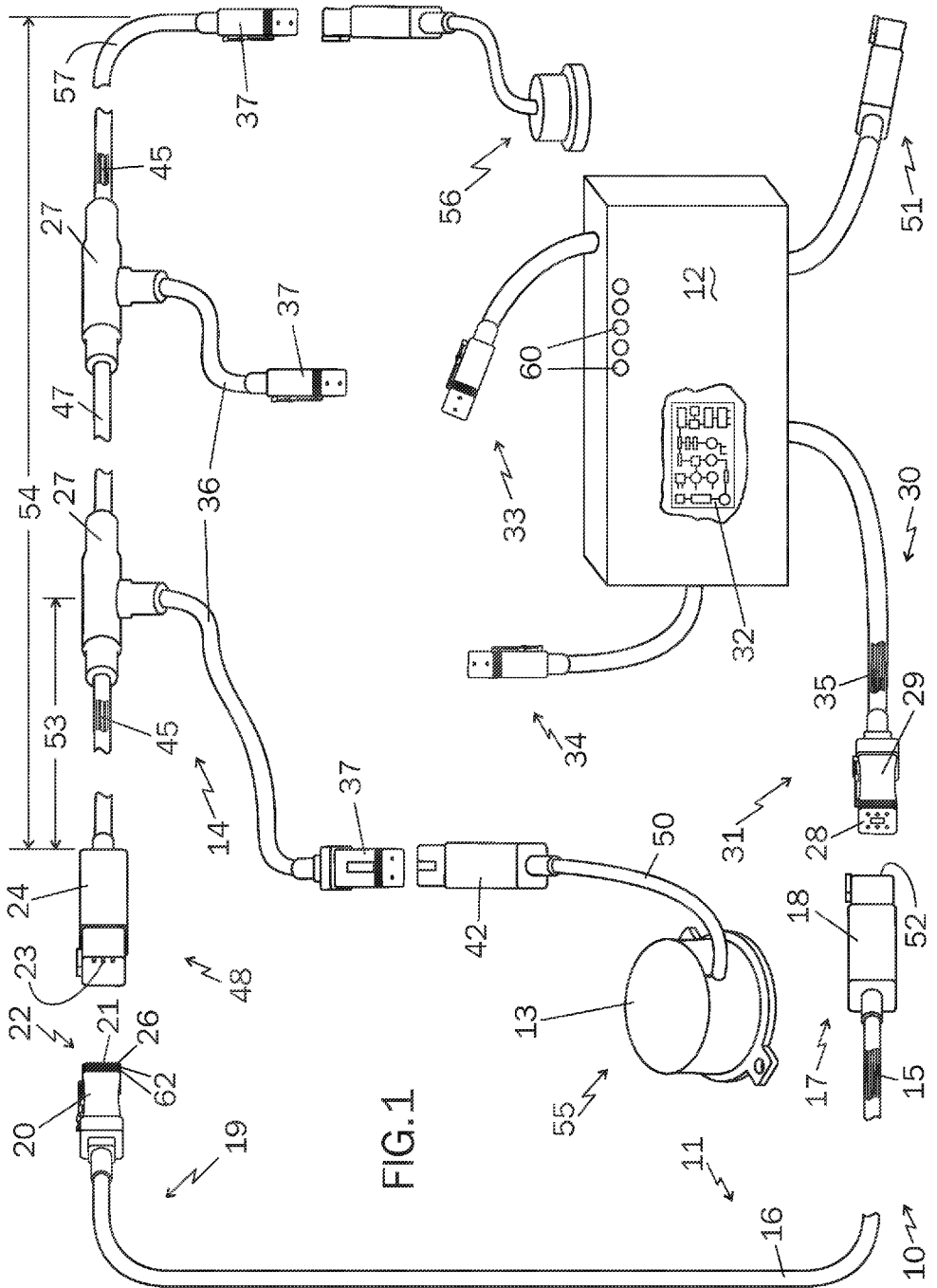
FIG. 1 is a wiring diagram for the preferred embodiment of the overfill warning wiring system of this invention.

Referring now to FIG. 1, the wiring system of this invention is generally shown by the number 10, wiring system 10 comprising a main body loom 11, a monitor 12, a plurality of manhole mounted sensor modules 13 and a topside harness 14. Main body loom 11 may have from two to twenty wires 15 sheathed in an aromatic hydrocarbon resistant cabling 16, cabling 16 terminated at a monitor end 17 with a fluid tight connector 18 and at topside end 19 with a fluid tight top-side connector 20. Topside harness 14 may also have from two to twenty wires 45 sheathed in an aromatic hydrocarbon resistant cabling 47, cabling 47 terminated at amain body loom end 48 with a fluid tight connector 24 and provided with a plurality of fluid tight "T"s 27, topside harness 14 to be fully described hereinafter. Manhole sensor modules 13 have a pigtail cabling 50 extending from a module cap 43, pigtail cabling 50 terminated with a female connector 42 for connection with "T"s 27 or connectors 37 of pigtails 36 of topside harness 14, manhole sensor 13 to be more fully described hereinafter. Monitor 12 comprises a circuit board 32 and has a main body loom pigtail 30, a power pigtail 34 and a socket pigtail 33 extending therefrom, monitor and pigtails 30, 33, 34 to be described hereinafter. Aromatic hydrocarbon resistant cabling 47, main body loom cabling 16, pigtail cabling 30, 33, 34, 50 and 136 are all specifically resistant to diesel fuel, gasoline, ethanol and combinations thereof, however, may be resistant to many other fuels as well.

Topside connector 20 of main body loom 11 is preferably a male connector with connection ports 21 recessed into an end 22 thereof, connection ports 21 adapted to receive pins 23 of topside harness connector 24 therein. Topside connector 20 has a nose 26 protruding therefrom which is sealingly affixed to topside harness connector 24 upon joiner of topside connector 20 with topside harness connector 24 preferably with a seal 62 surrounding nose 26 which engages an inside surface 63 of topside harness connector 24. It is, however, within the scope of this invention to provide topside harness connector 24 with an internal seal 25 disposed within topside harness connector 24 which sealing engages nose 26 of topside connector 20 of main body loom 11. Monitor end 17 of main body loom 11 preferably has a female connector 18 with a plurality of pins 52 extending therefrom which may be surrounded by a seal similar to seal 25 disposed in a groove therein, however, it is preferred that the seal surround nose 28 of male connector 29 wherein the seal is adapted to sealingly engage nose 28 of male connector 29 into female connector 18. Male connector 29 is on a free end 31 of a pigtail 30 wherein an opposed end of pigtail 30 is affixed to and potted to a circuit board 32 encased in monitor 12. Main body loom 11 extends from a point proximate monitor 12 along a body member of the tank truck toward the rear thereof, main body loom 11 affixed to an end of the tank truck alongside additional navigational cabling of the tank truck. Main body loom 11 has end 19 disposed proximate a rear end of a drain channel of the tank truck, end 19 adapted to have connector 20 thereof sealingly engaged with topside harness connector 24.

Monitor 12 may be a standard monitor as is currently used in the industry, however, preferably monitor 12 has been fitted with pigtail 30, another pigtail 33 for connection to the optic sockets of a fueling terminal and a third pigtail 34 for power from the tank truck to system 10 through monitor 12. Pigtails 30, 33, 34 have all connections made within monitor 12 and are fully potted to seal the connections from environmental factors. Since circuit board 32 and the connections for pigtails 30, 33 and 34 are fully potted in monitor 12, monitor 12 is also fully sealed from environmental factors prevalent in the field, thus achieving another goal of this invention. Pigtail 30 has a plurality of connecting wires 35 disposed therein equal to the number of connecting wires 15 in main body loom 11, main body loom 11 and pigtail 30 shown in FIG. 1 preferably having wires of different colors wherein the color scheme is identical in main body loom, pigtail 50 and topside wiring harness 24. The black wire is common and along with all of the other colored wires are sealingly connected through main body loom 11 and topside harness 14 to separate sensor modules 13 disposed in manhole covers of each separate compartment. The number of compartments in a tank truck determines the number of wires 15/35/45 used in pigtail 30, main body loom 11 and topside harness 14 with the unused wires grounded at monitor 12 as dummies to signal a full tank for a non-existent compartment. A dummy connector 51 may be affixed to monitor 12 for this purpose. Of course, the number of wires at any point within topside harness 14 is equal to the number of sensor modules remaining along the length 54 of topside harness 14 plus the ground wire.

Figure 2:
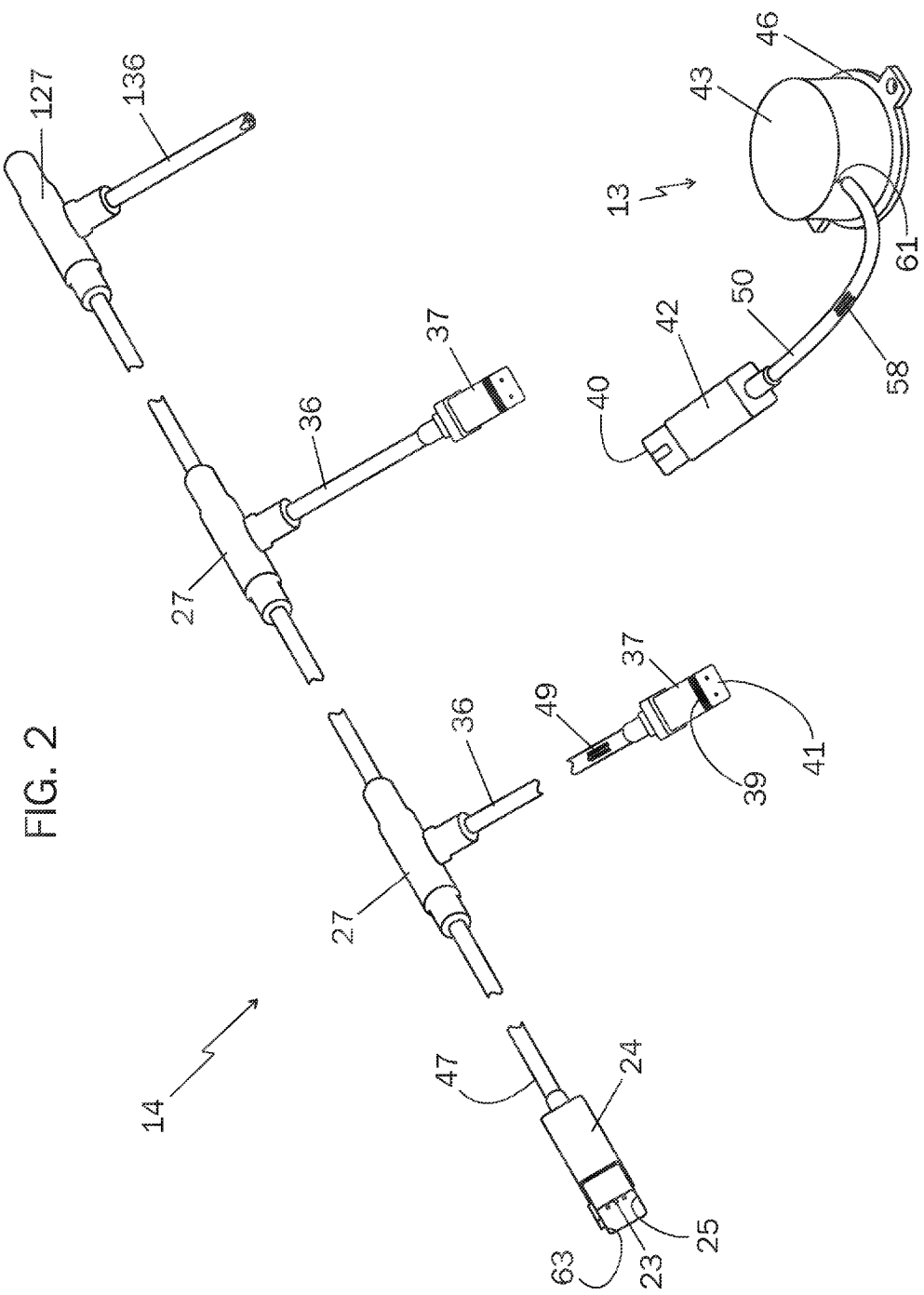
FIG. 2 is a perspective view of the topside wiring harness of the wiring system of FIG. 1 showing an end manhole connector, one intermediate manhole cover and a main harness connector.

Referring also to FIG. 2, topside harness 14 has plurality of "T"s 27 equal to the number of compartments in the tank truck disposed along the length 54, topside harness connector 24 disposed at one end thereof. Each "T" 27 has a pigtail 36 extending therefrom, pigtails 36 terminated with a fluid tight connectors 37 and spaced apart a distance proximate the distance between sensor modules 13 of the manhole covers. Fluid tight topside harness connector 24 is spaced from the last manhole cover sensor module 13 proximate the distance from the last sensor module 13 to the terminal end of the tank truck. Aromatic hydrocarbon resistant cabling 47 may have a number of wires 45 equal to the number of wires 45 in main body loom 11, however, cabling 47 preferably has the number of wires 45 disposed therein restricted to the number of compartments to be connected plus a common wire. Thus, for a four compartment tank truck, topside harness 14 has five wires 45 in a section represented by distance 53 from topside harness connector 24 to a first sensor 55, four wires 45 in the next section, three wires 45 in the next section and finally two wires 45 in a section 57 extending to a terminal sensor 56. At terminal sensor 56, cabling 47 may have connector 37 molded directly onto an end opposite topside harness connector 24 for connection to terminal sensor 56. Cabling 47 is assembled in this manner to save costs, to ensure proper connections to all sensors eliminating mistakes at assembly, repair or replacement, to save installation or replacement time and thus installation or replacement cost. In FIG. 2, topside harness connector 24 is shown with three "T"s 27, however, it should be understood that up to 20 "T"s 27 may be molded to a cabling 47 as required by the number of compartments to be connected by system 10, cabling 47 thus having a full complement of wires 45 at topside harness connector 27 to a first sensor 55 but still only two wires 45 therein at terminal sensor 56. Generally, a seven wire cable is used for most tank trucks in the U.S.A., though foreign tank trucks may have up to 20 compartments thus requiring at least a 21 wire cable. In an alternate embodiment shown at the right end of FIG. 2, each "T" 127 may have a pigtail 136 extending therefrom, pigtails 136 installed directly into sensor modules 13 and potted to sensor cap 43 at point 61, each pigtail 136 having a sensor wire and a ground wire encased therein. Additionally, it is within the scope of this invention to provide connector 42 as a part of module 13 and thus plug nose 41 of connector 37 directly into module 13 wherein connector 42 is potted onto module 13 at point 61.

An open end 40 of pigtail connector 42 may have a seal therein adapted to engage a nose 41 of fluid tight connector 37 of pigtail 36, however, it ie preferred to have a seal 39 generally disposed on nose 41 of connector 37 wherein seal 39 is adapted to sealingly engage nose 41 of connector 37 with pigtail connector 42 extending from a sensor module 13 thus completing a fluid tight connection from monitor 12 to sensor module 13. As sensor module 13 has all connections therein potted to ensure that sensor module 13 is fluid tight and therefore system 10 is fluid tight thus achieving another goal of this invention. Sensor module 13 is fitted with an optic overfill warning probe that extends into the compartment of the tank truck when the manhole carrying sensor 13 is closed, the optic overfill warning probes operating to sense a full condition of the tank truck compartment during the filling operation. As the compartment is filled from the bottom at a high rate of fluid flow, the optic overfill warning probe reacts within about 250 milliseconds to signal a full condition thus stopping flow of fuel into that compartment by passing a signal through sensor pigtail 50, topside harness 47, main body loom 11 and into monitor 12. Since sensor pigtails 50 have only two wires 49 therein, all sensor modules 13 are interchangeable. Since sensor modules 13 are interchangeable, installation and replacement costs, time and effort are greatly reduced thus achieving another goal of this invention.

Sensor modules 13 are provided with replaceable overfill warning probes fitted into a bottom side of a sensor cap 43. Cap 43 preferably has a flange 46 for affixing sensor 13 to a manhole cover of a tank truck. Alternately, sensor 13 may be threaded into the manhole cover and affixed therein by a jam nut (not shown) that matches threads of a threaded portion of sensor cap 43. The overfill warning probe preferably has an RJ45 phone jack wired to an optic sensor at a terminal end of the overfill warning probes, the phone jack adapted to plug into pigtail cabling 50 potted through sensor cap 43 at point 61 further simplifying installation, repair or replacement of this part of system 10. As only two wires are required to sense a level in a tank, pigtail cabling 50 normally has only two wires 58 encased therein.

Since system 10 is fully fluid tight from the API sockets through monitor 12, main body loom 11 and topside harness 14, few problems should arise, however, the driver may easily check for an operating condition by observing the sensor lights 60 visible through a transparent cover of monitor 12. Notwithstanding, it should be readily apparent that if a tank truck is denied a fueling ticket at a fueling facility, replacement of a faulty component can be accomplished in less than an hour at a repair facility since a faulty component can be readily determined by reference to the compartment lights 60 within monitor 12. For instance, if a sensor 13 is determined to be faulty, pigtail cabling 50 is disconnected from topside harness 14, sensor 13 replaced and reconnected to topside harness 14. Though more time would be required to replace topside harness 14 as topside harness 14 is connected to every sensor, main body loom connector 20 and to one rail of the drain channel of the tank truck by cable clips, even replacement of topside harness 14 may be quickly accomplished. In a similar manner, main body loom 11 could be replaced by disconnecting connectors 18 and 20, removing cabling 16 from retaining clips and replacing same with a new main body loom 11 by reversing the disassembly process. Also readily apparent is replacement of monitor 12 as the three pigtail connectors 30, 33 and 34 may be readily disconnected, monitor 12 replaced and reconnected in short order.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. An overfill warning wiring system for tank trailers having a plurality of tanks with manhole covers, the wiring system produced by the process of:
    providing a pre-wired topside harness, comprising:
        a cabling including wires, the cabling extending between a loom end and a terminal end;
        a plurality of fluid tight "T"s arranged along the cabling at a spacing corresponding to the spacing of the manhole covers; and
        a pigtail including wiring, the wiring electrically connected to the wires of the cabling, extending from each fluid tight "T";
    molding the fluid tight "T"s to the cabling and the pigtail providing a fluid tight connection therebetween;
    providing a plurality of fluid tight sensor connectors;
    molding a fluid tight sensor connector to the end of the pigtail extending from each fluid tight "T" providing a fluid tight connection therebetween;
    providing a plurality of fluid tight topside harness connectors; and
    molding a fluid tight topside harness connector to the loom end and the terminal end providing a fluid tight connection therebetween.

2. The wiring system of claim 1, further comprising:
    providing a main body loom, comprising:
        a cabling including wires, the cabling extending between a topside end and a monitor end;
        a fluid tight topside connector at the topside end;
        a fluid tight monitor connector at the monitor end;
    molding the fluid tight topside connector to the cabling providing a fluid tight connection therebetween; and
    molding the fluid tight monitor connector to the cabling providing a fluid tight connection therebetween.

3. The wiring system of claim 1, further comprising:
    providing a plurality of overfill warning sensor modules, comprising:
        a plurality of overfill warning sensor modules for installing at the manhole covers;
        a plurality of pigtails including wiring, the wiring electrically connected to an overfill warning sensor module and extending from the sensor module to a topside harness end;
        a fluid tight pigtail connector at each topside harness end; and
    molding each fluid tight pigtail connector to the pigtail providing a fluid tight connection therebetween.

4. The wiring system of claim 3, wherein the wires of the overfill warning sensor module pigtail comprise a sensor wire and a ground wire.

5. The wiring system of claim 4, wherein the number of wires of the main body loom comprise:
    the number of overfill warning sensor modules connected to the topside harness; and
    a ground wire.

6. The wiring system of claim 3, wherein the number of wires of the topside harness comprise:
    the number of overfill warning sensor modules connected thereto; and
    a ground wire.

7. The wiring system of claim 3, wherein:
    the fluid tight sensor connector comprises a male connector;
    the fluid tight pigtail connector comprises a female connector; and
    wherein the male and female connectors provide a fluid tight connection.

8. The wiring system of claim 3, further comprising providing an overfill wiring probe electrically connected to the overfill warning sensor module.

9. The wiring system of claim 1, wherein the cabling is encased in a specialty polymer resistant to aromatic hydrocarbons.

10. An overfill warning wiring system for tank trailers having a plurality of tanks with manhole covers, the wiring system produced by the process of:
    providing a pre-wired topside harness, comprising:
        a cabling including wires, the cabling extending between a loom end and a terminal end;

a plurality of fluid tight "T"s arranged along the cabling at a spacing corresponding to the spacing of the manhole covers; and
a pigtail including wiring, the wiring electrically connected to the wires of the cabling, extending from each fluid tight "T";

molding the fluid tight "T"s to the cabling and the pigtail providing a fluid tight connection therebetween;
providing a plurality of fluid tight sensor connectors;
molding a fluid tight sensor connector to the end of the pigtail extending from each fluid tight "T" providing a fluid tight connection therebetween;
providing a plurality of fluid tight topside harness connectors;
molding a fluid tight topside harness connector to the loom end and the terminal end providing a fluid tight connection therebetween;
providing a main body loom, comprising:
  a cabling including wires, the cabling extending between a topside end and a monitor end;
  a fluid tight topside connector at the topside end;
  a fluid tight monitor connector at the monitor end;
molding the fluid tight topside connector to the cabling providing a fluid tight connection therebetween;
molding the fluid tight monitor connector to the cabling providing a fluid tight connection therebetween;
providing a monitor, comprising:
  a main body loom pigtail including wiring, the wiring electrically connected and potted to the monitor, extending from the monitor to a main body loom end;
  a fluid tight loom connector at the main body loom end;
molding the fluid tight loom connector to the monitor main body loom pigtail providing a fluid tight connection therebetween;
wherein the fluid tight topside harness loom end connector and the main body loom topside end connector provide a fluid tight connection therebetween; and
wherein the main body loom monitor end connector and the monitor loom connector provide a fluid tight connection therebetween.

11. The wiring system of claim 10, further comprising:
providing a plurality of overfill warning sensor modules, comprising:
  a plurality of overfill warning sensor modules for installing at the manhole covers;
  a plurality of pigtails including wiring, the wiring electrically connected to an overfill warning sensor module and potted thereto, extending from the sensor module to a topside harness end; and
  a fluid tight pigtail connector at each topside harness end; and
molding each fluid tight pigtail connector to the pigtail providing a fluid tight connection therebetween.

12. The wiring system of claim 11, further comprising providing an overfill wiring probe electrically connected to the overfill warning sensor module.

13. The wiring system of claim 12, wherein the pre-wired topside harness cabling wires are different colors, and a colored wire is specific to a pre-wired topside harness pigtail.

14. The wiring system of claim 13, wherein:
each pre-wired topside harness pigtail includes a ground wire and a colored wire;
each overfill warning sensor module pigtail wiring includes a ground wire and a colored wire;
upon connection of a pre-wired topside harness fluid tight pigtail connector with an overfill warning sensor module fluid tight pigtail connector, the ground wires are connected and the colored wires are connected.

15. The wiring system of claim 10, wherein:
the pre-wired topside harness cabling and pigtails, and main body loom are encased in a specialty polymer resistant to aromatic hydrocarbons.

* * * * *